June 22, 1926.
M. E. INFIORATI, JR
1,589,701
BELT SHIFTING MECHANISM
Original Filed Sept. 12, 1922  2 Sheets-Sheet 2
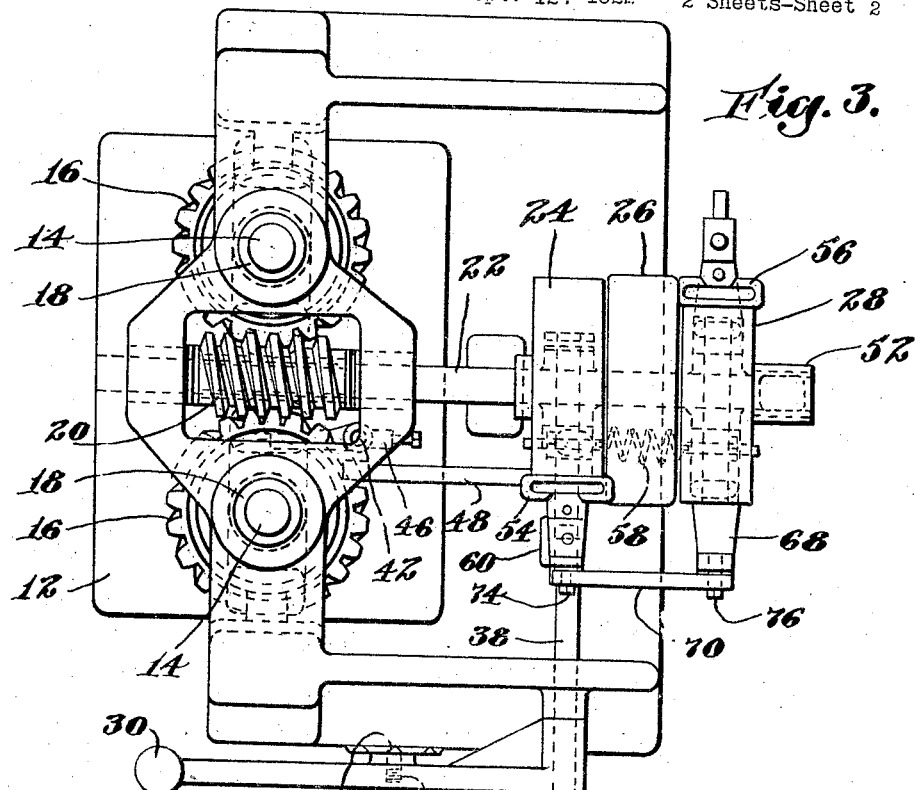
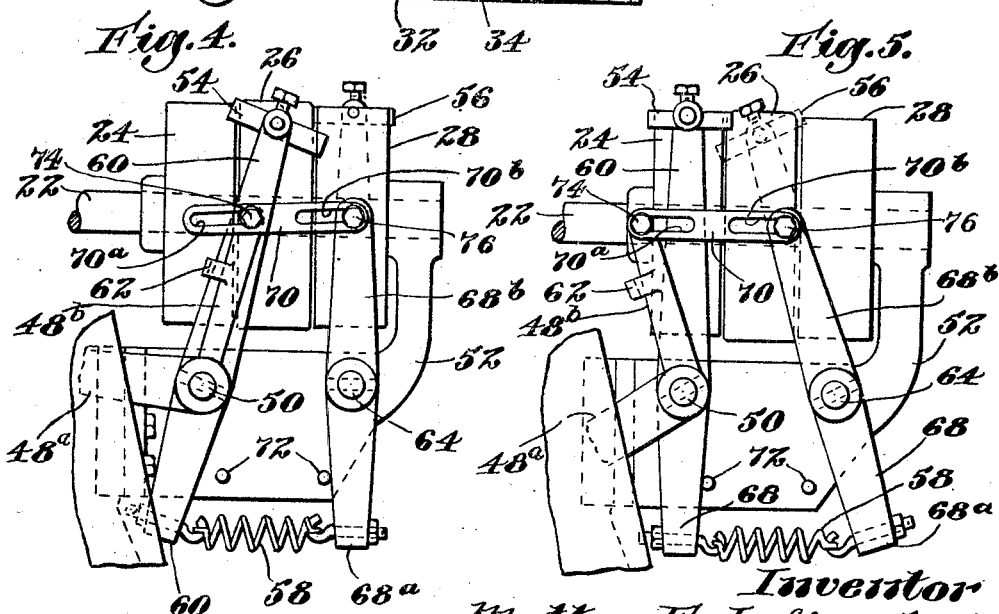
Inventor
Matteo E. Infiorati, Jr.
by Mitchell, Chadwick & Kent
Attorneys Patented June 22, 1926.

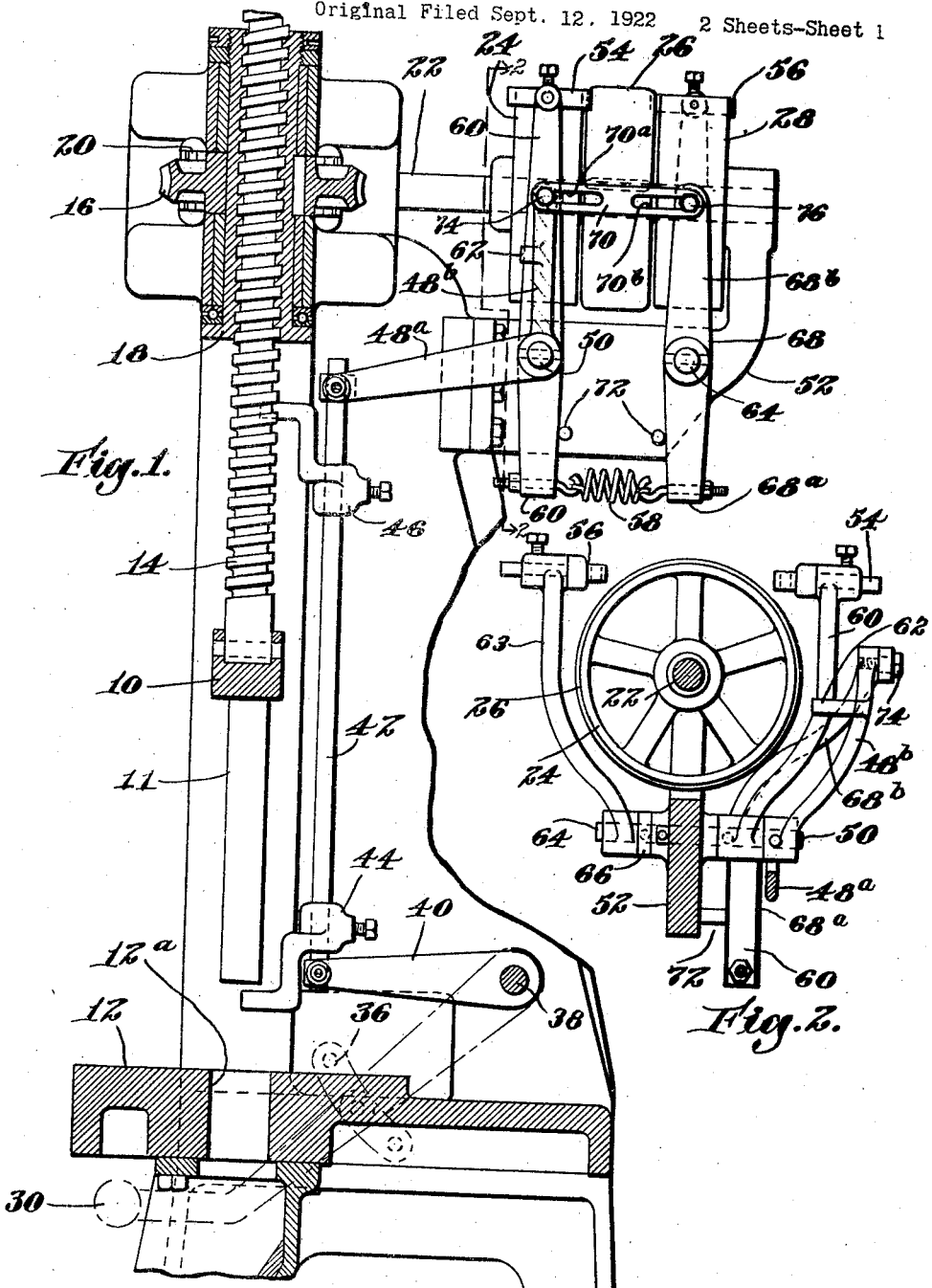

1,589,701

UNITED STATES PATENT OFFICE.

MATTEO E. INFIORATI, JR., OF DAYTON, OHIO, ASSIGNOR TO THE J. N. LAPOINTE COMPANY, OF NEW LONDON, CONNECTICUT, A CORPORATION OF MAINE.

BELT-SHIFTING MECHANISM.

Original application filed September 12, 1922, Serial No. 587,677. Divided and this application filed August 7, 1924. Serial No. 730,555.

This invention relates to improvements in belt shifting mechanism, whereby the operation of a machine may be automatically stopped at any predetermined point. It is particularly applicable to terminate the travel of a reciprocating machine in both directions. As illustrated it is applied to a broaching machine having a pair of reciprocating heads arranged to move simultaneously in opposite directions of travel, being a division of subject matter disclosed but not claimed in my pending application for patent Serial No. 587,677. However, as the utility of this belt shifting means relates to the driving means rather than to the nature of work done by the machine, it is obvious that it may be applied also to other kinds of machines.

Among the objects is the provision of a reversible belt drive in which only single width belt-pulleys need be used, and only three of these are required. For starting, a belt is shifted by the operator, to the single drive pulley, but while its return is effected by the travel of the machine, the speed of its return is not necessarily that at which the traveling element of the machine may be moving, but may if desired be more gentle, the speed of action in this respect being controlled by the strength selected for a spring. Each belt, unless held positively on the drive pulley, tends always to return to and stay on its own loose pulley. Other features will be noticed in the description which follows.

The embodiment of the invention herein illustrated comprises three single width belt pulleys mounted adjacent one another on a drive shaft, the middle one being fast on the shaft and the others loose thereon. The driving belts, running in opposite directions on the outer pulleys when the machine is idle, are selectively shifted to the inner pulley by a system of linkage operated manually. Between the hand lever and the belt shifting levers of this linkage are elements which form a rigid connection when the belt is being shifted to driving position, or while it is held there, but which, upon the shifting of the hand lever either manually or automatically by dogs attached to the traveling element to release the belt, form a lost motion connection which permits the burden of actually returning the belt to its idle pulley to be undertaken and borne by a spring device attached to both belt shifting levers. This spring means always tends to move the belts toward or hold them upon their idle pulleys. When ordinarily shifting a belt from driving to idle position, the spring applies a steady pull on a belt, to move it at uniform speed irrespective of the speed at which the hand lever is thrown. If, however, the belt which has been upon its idle pulley, while the other belt is driving, is manually shifted toward driving position before the spring has wholly effected the removal of the other belt from the drive pulley, the spring will be further elongated and its pull upon the retreating belt increased to the end that the shifting of the latter is hastened, thus getting it out of the way of the belt that is being moved to driving position.

In the accompanying drawings the machine to which the belt shifting mechanism is applied typifies any sort of machine having a traveling element whose movements can be utilized to effect automatically the actuation of the belt shifting mechanism to stop the machine's operations. It is intended that the patent shall cover by suitable expression in the appended claims whatever features of patentable novelty exist in the invention disclosed.

In the drawings:

Figure 1 is a side elevation of a machine partly in section, embodying the belt shifting mechanism of the present invention;

Figure 2 is an elevation taken on line 2—2 of Figure 1;

Figure 3 is a plan view; and

Figures 4 and 5 are side elevations showing different positions of the belt shifting mechanism.

Referring to the drawings, the particular machine illustrated is a push press broaching machine having traveling broach heads 10, guided on ways 11, for propelling broaches through work supported on the table 12. These heads constitute the moving element of a machine tool, whose travel is to be controlled by the belt shift mechanism. They are mounted on vertical screwthreaded shafts 14 which reciprocate up and down according as the worm gears 16 and rotatable nuts 18 at the top are revolved in one direction or another by the horizontal worm 20 between them. This worm is fixed on the drive shaft 22 which extends rearward of the head, carrying three pulleys, 24, 26 and 28, of which the outside two 24 and 28 are loose thereon and the middle one 26 is tight. Two belts (passing through cages 54, 56, but not shown), one straight and the other crossed, run oppositely on the two loose pulleys when the machine is idle. Upon the shifting of either belt to the middle pulley the worm or drive shaft 22 is rotated in accordance with the direction of travel of the belt so shifted.

It is a feature of the invention to provide a combined hand and automatic control for shifting the belts. To this end there is a hand lever 30 provided with a detent pin 32 which acting as a latch under pressure of a coiled spring 34 engages holes 36 in a fixed sector plate so that when the lever is moved by the operator it will normally be stopped by the detent pin at a predetermined position in its swing, which is correct for the belt drive, and held there until dislodged by sufficient force, such as may be applied by the broaching head, or by hand, at the end of desired travel. The fulcrum of this hand lever is shaft 38, upon which the arm 30 is fixed, and to which its other arm 40 is also fast. The latter is linked through a vertical rod 42 (upon which are dogs, 44, 46, adjustable in the path of the broach head 10 to determine its upper and lower limits of travel) to an approximately horizontal arm 48$^a$ of a bell crank lever 48 whose fulcrum is a shaft 50 in fixture 52 holding the pulleys on the rear of the machine. The axis of shaft 50 is perpendicular to that of the drive shaft 22 and the pulleys, so that the vertical arm 48$^b$ of this bell crank swings alongside the drive shaft in direction to shift the belts. Such swinging occurs whenever the rod 42 is moved by the handle 30 or by either dog 44 or 46.

However, the bell crank 48 does not shift the belts directly. Instead it operates the belt cages 54 and 56 through lost motion connections. When the handle 30 and arm 48$^a$ rise, the belt cage 54 moves a belt from pulley 24, to drive the broach head down, and when said handle and arm go down, the belt cage 56 moves another belt from pulley 28 to drive the broach head up. Moreover it does not positively shift either of these belts off from the drive pulley 26, that function being performed by power which is stored in a spring 58 when the belt is moved to the drive pulley by the bell crank 48. This spring is too weak to act except when the detent 32 is disengaged as herein explained, which occurs whenever the bell crank is by hand or machine power swung back from either setting position.

Normally the belt is shifted to driving position by the hand of the operator, and is shifted from it by the power of said spring, and therefore is always removed with a suitably gentle touch, without the speed at which the machine throws the bell crank out of the way determining the speed of travel of the belt. Moreover, by this said device, details of which are hereinafter described, it is provided that each belt tends always to return to and stay on its loose pulley, whenever not latched on the drive pulley, and this makes it safe to have the lost motion in its connections, which permits of using single width pulleys, and has other advantages.

The belt cage 54 is on a lever 60 which extends thence down to below its loose fulcrum on shaft 50 (which shaft is also the fulcrum of the bell crank 48). Above its fulcrum the lever 60 is engaged and moved at times by the lug 62 on bell crank lever 48 when the latter pushes it into driving position as seen in Figure 4. Below the fulcrum the lever is attached to a spring 58 which constantly pulls the lever toward its loose pulley position seen in Figures 1 and 5, but actually moves it thither only when the lug 62 permits.

The belt cage 56 is on the other side of the pulley 28, on a lever 63 which is more or less concealed by other parts in the drawing. In Figure 2 it is seen extending downward to its fulcrum or shaft 64, which in this figure is directly behind shaft 50, except that shaft 64 extends a little further to the left than shaft 50, which ends at collar 66. This fulcrum 64 extends through to the right side of the pulleys and there carries a lever 68 with arms marked 68$^a$ and 68$^b$ extending respectively downward to the spring 58 and upward to a link 70. These would ordinarily be mostly concealed by levers 48 and 60 in Figure 2, but for the sake of making them visible they are there represented as being slightly larger than those levers and curved on different lines. This lever 68 is actuated by the link 70, to set its belt in driving position, when said link is pulled by the bell crank lever 48, on which occasions it shifts from the position of Figure 1 to that of Figure 5; and is actuated by spring 58 to restore the belt to loose pulley 28 whenever the bell crank pull on link is relaxed by the return of the bell crank to the position of Figure 1. The lost motion provided by either slot 70$^a$ or 70$^b$ in this link permits the bell crank 48 to move to its position for drive in the opposite direction without moving the belt on the pulley 28. In the shifting device it will be seen that the connection of the shift operating devices, 30, 44, 46, to each belt cage 54 or 56, has lost motion when it is moving either belt toward the other, so that the other is not simultaneously pushed or pulled thereby in the same direction. Stop pins 72 prevent any such motion occurring accidentally or as a result of the pull of the spring 58.

In operation, the parts being at rest as in Figure 1, the operator sets a piece of work on the table 12 with its hole over the hole 12ª and drops a push broach into it. He then raises the starting lever 30 by hand. This throws lug 62 to the right and produces the setting shown in Figure 4 shifting the belt from pulley 24 to 26, but the pin 74 moves freely in the slot 70ª in link 70, and imparts no motion to that link or the belt on pulley 28. This starts the down drive of the broach head 10. When the head reaches a point predetermined by the setting of dog 44, its engagement with said dog depresses rod 42, pulling the bell crank lever 48 back to Figure 1 position and in so doing pulley lug 62 away from the lever 60. This allows spring 58 to pull the belt back to the loose pulley 24 without affecting belt lever 68; and the machine stops. To start travel of the head in reverse direction the operator depresses the lever 30. As the pins 74, 76 are already at the opposite extremities of the slots provided in link 70, the pull of the bell crank 48 which accompanies this depression, pulls link 70 and lever 68 to the left to the position of Figure 5, with lug 62 moving away from lever 60 and therefore not affecting it. The head starts upward and continues in motion until it engages the dog 46 and restores the bell crank to the position of Figure 1 and stops the machine. Either one of the slots in link 70 may be omitted.

The mechanism described provides a machine that cannot be started except by the operator, but which may be stopped either by him or by the automatic mechanical means. The operator need not concern himself with the stopping, and can give his entire attention to other matters about the machine, or elsewhere, while the machine is in operation. This insures that there shall be no inadvertent over-travel, with damage that might result therefrom.

I claim as my invention:

1. A belt shifting mechanism for controlling the rotation of a drive shaft, comprising a pulley tight thereon and one loose thereon on each side of it, and apparatus for moving the belt of each loose pulley to the tight pulley; said apparatus comprising a pair of levers one for each belt, fulcrumed on separate axes and separately movable to shift said belts; a third lever, fulcrumed on the same axis with one of the belt shifting levers and having a lug arranged to engage and to move one of the belt-shifting levers toward the tight pulley when said third lever is swung in one direction, there being spring means holding the other belt-shifting lever against shifting, and for returning said belt shifting lever to its loose pulley position when said lug is withdrawn from engagement therewith.

2. A belt shifting mechanism for controlling the rotation of a drive shaft; comprising three adjacent pulleys thereon, the two outside ones being loose and the middle one tight, and apparatus for moving the belt from each loose pulley to the tight pulley; said apparatus comprising a pair of levers fulcrumed on separate axes and separately movable to shift said belts; a third lever, fulcrumed on the axis of one of them; and a link connecting said third lever with the other of them, whereby upon the third lever being swung away from the tight pulley, said other is moved toward the tight pulley to shift its belt thereon; there being a pin and slot connection between said link and one of the levers it connects, whereby the said third lever may return to its first position without forcing said other lever back to its loose pulley position; and spring means for returning said other lever to its pulley position when said third lever has been moved back to its initial position.

3. A power control mechanism comprising a drive shaft having two pulleys loose thereon and a driving pulley fast thereon between the loose pulleys; means for shifting a belt between each loose pulley and the fast pulley; comprising a pair of parallel levers; stops for the levers limiting the swing of each away from the fast pulley, spring means connecting the levers and reacting against the stop of one lever to impel the other lever to its stop whenever such other lever is in drive position; and yieldable means stronger than said spring for holding the lever in drive position; whereby the spring returns the lever to loose pulley position when said stronger means is overcome.

Signed at Dayton, Ohio, this 28th day of July, 1924.

MATTEO E. INFIORATI, Jr.